(12) United States Patent
Bursey et al.

(10) Patent No.: US 8,972,398 B1
(45) Date of Patent: Mar. 3, 2015

(54) INTEGRATING ONLINE SEARCH RESULTS AND SOCIAL NETWORKS

(75) Inventors: Adam D. Bursey, San Jose, CA (US); Kristopher Michael Hom, San Jose, CA (US); Amay Nitin Champaneria, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/406,364

(22) Filed: Feb. 27, 2012

Related U.S. Application Data

(60) Provisional application No. 61/447,660, filed on Feb. 28, 2011.

(51) Int. Cl.
 *G06F 17/30* (2006.01)
(52) U.S. Cl.
 USPC ............................ 707/732; 707/723; 707/706
(58) Field of Classification Search
 None
 See application file for complete search history.

(56) References Cited

U.S. PATENT DOCUMENTS

| | | | | |
|---|---|---|---|---|
| 7,818,394 B1 * | 10/2010 | Lawler et al. | ............... | 709/217 |
| 2007/0198662 A1 * | 8/2007 | Parham et al. | ............... | 707/706 |
| 2009/0164929 A1 * | 6/2009 | Chen et al. | ................... | 715/769 |
| 2010/0257459 A1 | 10/2010 | Galbreath et al. | | |
| 2010/0274815 A1 * | 10/2010 | Vanasco | ........................ | 707/798 |
| 2011/0078190 A1 | 3/2011 | Samuel et al. | | |
| 2011/0320423 A1 * | 12/2011 | Gemmell et al. | ............. | 709/219 |
| 2012/0036154 A1 | 2/2012 | Vellaikal | | |
| 2012/0174203 A1 | 7/2012 | Frank | | |

* cited by examiner

*Primary Examiner* — Tony Mahmoudi
*Assistant Examiner* — Umar Mian
(74) *Attorney, Agent, or Firm* — Morgan, Lewis & Bockius LLP

(57) ABSTRACT

A method includes receiving a search query from a client system associated with a first user, and obtaining one or more candidate identifiers associated with the first user. The method also includes identifying a social network set of search results matching the search query and social network criteria for the first user. The social network criteria is satisfied for a respective search result when the respective search result is authored or annotated by one or more author identifiers, and at least one author identifier of the one or more author identifiers is associated with at least one candidate identifier of the one or more candidate identifiers associated with the first user. The method also includes providing to the client system a list of search results including at least a subset of the social network set of search results.

16 Claims, 13 Drawing Sheets

| External Account Identifier 448-1 | Privacy Setting(s) 450-1 |
| --- | --- |
| External Account Identifier 448-2 | Privacy Setting(s) 450-2 |
| • • • | • • • |
| External Account Identifier 448-q | Privacy Setting(s) 450-q |

External Accounts Info 435

Figure 4B george.washington@usa.gov

| bbq | Search |

About 51,500,000 results (0.22 seconds)

Related searches for bbq:
Brands: Weber  Fire Magic  Big Green Egg  Coleman  Char-Broil
Stores: Barbeques Galore  Home Depot  Lowe's  Target  Sears Barbecue – Wikipedia, the free encyclopedia ☆ 🔍
Barbecue or barbeque (common spelling variant) (with abbreviation BBQ, Bar-B-Q and diminutive form; Barbie, used chiefly in Australia or New Zealand; ...
Etymology – Styles – Events and gatherings – Techniques
Http://en.wikipedia.org/wiki/Barbecue – Cached - Similar BBQ – Gas Grills, Charcoal Grills, Electric Grills, and BBQ ... ☆ 🔍
We carry a full line of dcs gas grills, weber gas grills and more. Plus a large amount of charcoal grills, electric grills and bbq grilling accessories.
Gar Grills – Charcoal Grills – BBQ Smokers – Electric Grills
Http://www.bbq.com/ - Cached - Similar ⊠ Thomas Jefferson shared this on Twitter with ◉ gwashington
Are you ◉ gwashington on Twitter?  | Yes | | No |  Learn more Uncle Frank's BBQ ☆ 🔍
Uncle Frank's smoked meats include mouth watering Beef Brisket (smoked for over 30 hours) succulent Pork Ribs, delectable Beef Links and scrumptious ...
www.unclefranksbbq.com/ - Cached - Similar
2135 Old Middlefield Way, Mountain View
"First of all, I'ma fan of their sauce. It's sweet and tangy and spicey."

Salt Lick Bar-B-Que Restaurant – Austin, Round Rock ... ☆ 🔍
The Salt Lick Bar-B-Que restaurants in Austin, round Rock, and the Texas Hill Country provide the perfect texas bar-b-q experience. Visiting Salt Lick is ...
www.saltlickbbq.com/ - Cached - Similar

Figure 5A george.washington@usa.gov

| bbq | Search |

About 47,500,000 results (0.22 seconds)

Related searches for bbq:
Brands: Weber  Fire Magic  Big Green Egg  Coleman  Char-Broil
Stores: Barbeques Galore  Home Depot  Lowe's  Target  Sears Salt Lick Bar-B-Que Restaurant – Austin, Round Rock ... ☆ ◉
The Salt Lick Bar-B-Que restaurants in Austin, round Rock, and the Texas Hill Country provide the perfect texas bar-b-q experience. Visiting Salt Lick is ...
www.saltlickbbq.com/ - Cached – Similar
⊠ Thomas Jefferson shared this on Twitter – 5 minutes ago BBQ – Gas Grills, Charcoal Grills, Electric Grills, and BBQ ... ☆ ◉
We carry a full line of dcs gas grills, weber gas grills and more. Plus a large amount of charcoal grills, electric grills and bbq grilling accessories.
Gar Grills – Charcoal Grills – BBQ Smokers – Electric Grills
Http://www.bbq.com/ - Cached – Similar
⊠ Thomas Jefferson, and ▥ John Adams shared this Barbecue – Wikipedia, the free encyclopedia ☆ ◉
Barbecue or barbeque (common spelling variant) (with abbreviation BBQ, Bar-B-Q and diminutive form; Barbie, used chiefly in Australia or New Zealand; ...
Etymology – Styles – Events and gatherings – Techniques
Http://en.wikipedia.org/wiki/Barbecue – Cached – Similar
⊠ Thomas Jefferson, ▥ John Adams, and 43 other people shared this Uncle Frank's BBQ ☆ ◉
Uncle Frank's smoked meats include mouth watering Beef Brisket (smoked for over 30 hours) succulent Pork Ribs, delectable Beef Links and scrumptious ...
www.unclefranksbbq.com/ - Cached - Similar
2135 Old Middlefield Way, Mountain View
"First of all, I'ma fan of their sauce. It's sweet and tangy and spicey."

| bbq | Search | george.washington@usa.gov

About 51,500,000 results (0.22 seconds)

Related searches for bbq:
Brands: Weber  Fire Magic  Big Green Egg  Coleman  Char-Broil
Stores: Barbeques Galore  Home Depot  Lowe's  Target  Sears  502-5

BBQ – Gas Grills, Charcoal Grills, Electric Grills, and BBQ ...
We carry a full line of dcs gas grills, weber gas grills and more. Plus a large amount of charcoal grills, electric grills and bbq grilling accessories.
Gar Grills – Charcoal Grills – BBQ Smokers – Electric Grills
Http://www.bbq.com/ - Cached - Similar
Thomas Jefferson shared this on Twitter   522  524   520

We added gwashington to your account – Undo – Change Twitter account
  Also add to my public profile     Learn more
                                                           502-6

Barbecue – Wikipedia, the free encyclopedia
Barbecue or barbeque (common spelling variant) (with abbreviation BBQ, Bar-B-Q and diminutive form; Barbie, used chiefly in Australia or New Zealand; ...
Etymology – Styles – Events and gatherings – Techniques
Http://en.wikipedia.org/wiki/Barbecue – Cached – Similar
Thomas Jefferson shared this on Twitter

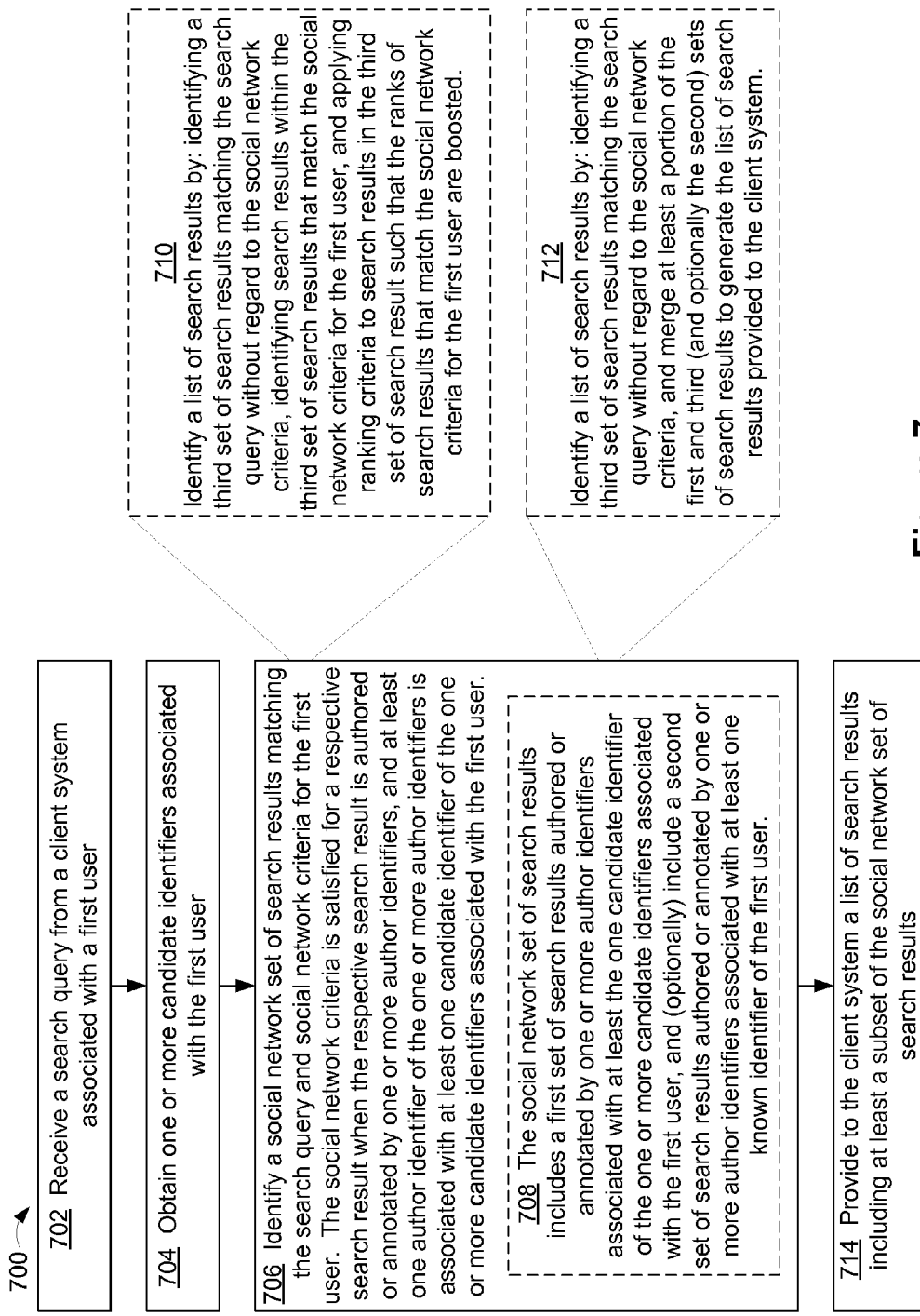

INTEGRATING ONLINE SEARCH RESULTS AND SOCIAL NETWORKS

RELATED APPLICATIONS

This application claims priority to U.S. Provisional Application Ser. No. 61/447,660, filed Feb. 28, 2011, which is incorporated herein by reference in its entirety.

This application is related to U.S. patent application Ser. No. 13/361,922, filed Jan. 30, 2012, which claims priority to U.S. Provisional Patent Application Ser. No. 61/437,540, filed Jan. 28, 2011. Both of these applications are incorporated herein by reference in their entireties.

BACKGROUND

The disclosed embodiments relate generally to providing search results in response to a search query, and particular to systems, methods and user interfaces in which such search results include one or results authored or annotated by an entity associated with an identifier that is either known to an identifier of the user who submitted the search query or that has been identified as a candidate identifier of the user in accordance with predefined criteria or a predefined selection process. For example, the authoring or annotating entity may be associated with the user via one or more social networking services.

Computer networks play a significant role in our lives, as more people gain access to the computer networks (e.g., the Internet) and people use the computer networks for more activities. Increasingly, more people use more than one account (e.g., email addresses, account names, or other identifiers) in accessing resources on the computer networks. Frequently, a user may not use a same account name for various services on the computer networks, for example in using social networking services.

However, existing methods are not efficient at managing information posted by a same person using multiple accounts. Therefore, there is a need for a new method and system for identifying and managing multiple user accounts.

SUMMARY

A number of embodiments (e.g., of server systems, client systems or devices, and methods of operating such systems or devices) are presented below. These embodiments provide methods, systems, and graphical user interfaces (GUIs) for identifying candidate identifiers for a user.

As described in more detail below, some embodiments involve a computer-implemented method performed at a server system having one or more processors and memory storing one or more programs for execution by the one or more processors. The method performed at the server system includes identifying a set of candidate identifiers for a first user. The method also includes, for each respective online service of a plurality of online services: retrieving, from one or more servers associated with the respective online service, information corresponding to a plurality of the candidate identifiers in the set of candidate identifiers; comparing the information retrieved for each respective candidate identifier of the plurality of candidate identifiers with information corresponding to the first user to produce a match result for each respective candidate identifier; and conditionally, in accordance with the match results for the plurality of candidate identifiers, identifying a best matching candidate identifier for the first user. The method furthermore includes providing the best matching candidate identifiers for the first user, corresponding to at least a subset of the plurality of online services, for use in a subsequent process.

In accordance with some embodiments, a method is performed at a server system having one or more processors and memory storing one or more programs for execution by the one or more processors. The method includes receiving a search query from a client system associated with a first user, and obtaining one or more candidate identifiers associated with the first user. The method also includes identifying a social network set of search results matching the search query and social network criteria for the first user. The social network criteria is satisfied for a respective search result when the respective search result is authored or annotated by one or more entities having author identifiers, and at least one author identifier of the one or more author identifiers is associated with at least one candidate identifier of the one or more candidate identifiers associated with the first user. The method furthermore includes providing to the client system a list of search results including at least a subset of the social network set of search results.

In accordance with some embodiments, a system comprises one or more processors for executing programs and memory storing one or more programs for execution by the one or more processors. The one or more programs include instructions executed by the one or more processors so as to perform any of the aforementioned methods.

In accordance with some embodiments, a computer readable storage medium stores one or more programs configured for execution by a computer. The one or more programs include instructions for performing any of the aforementioned methods.

In accordance with some embodiments, a graphical user interface is displayed at a computer system having one or more processors and memory storing one or more programs for execution by the one or more processors. The graphical user interface includes: a list of search results, including respective search results annotated by respective secondary users who are associated with one or more respective candidate identifiers of a user of the computer system; and one or more confirmation affordances. A respective confirmation affordance is for confirming that the user of the computer system is an owner of a corresponding candidate identifier, and the respective confirmation affordance includes a user interface object for confirmation. In response to receiving a user input activating the user interface object for confirmation, a confirmation message is concurrently displayed with at least a subset of the list of search results.

BRIEF DESCRIPTION OF THE DRAWINGS

For a better understanding of the aforementioned embodiments, reference should be made to the Description of Embodiments below, in conjunction with the following drawings in which like reference numerals refer to corresponding parts throughout the figures.

FIG. 4B is a block diagram illustrating examples of external accounts information, in accordance with some embodiments.

FIGS. 5A-5D illustrate examples of user interfaces displayed at a client, in accordance with some embodiments.

FIG. 7 is a flowchart representing a method of identifying a social network set of search results, in accordance with some embodiments.

Like reference numerals refer to corresponding parts throughout the drawings.

DESCRIPTION OF EMBODIMENTS

Figure 1:
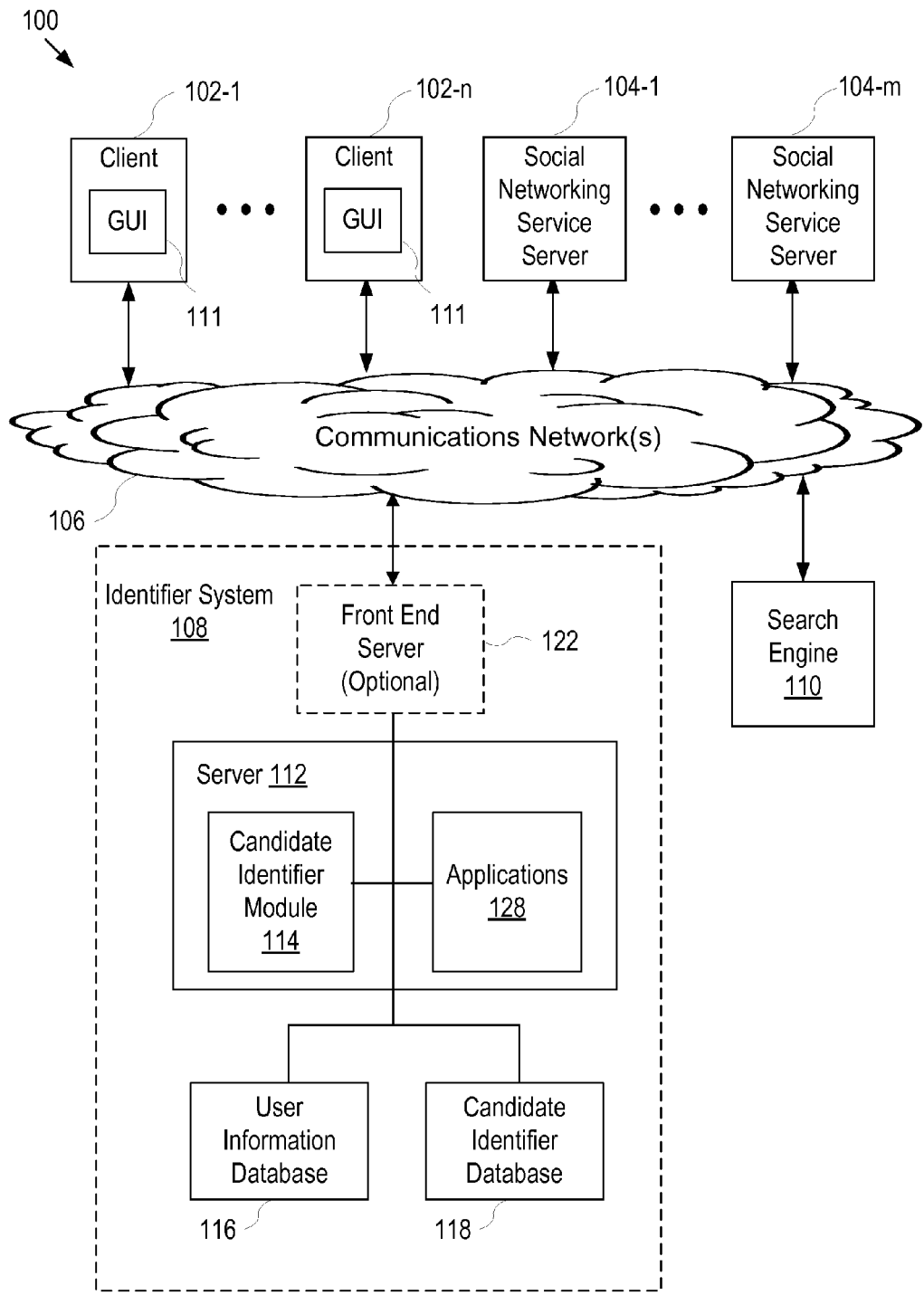
FIG. 1 is a block diagram illustrating an example of a distributed computer system, in accordance with some embodiments.

Methods and systems for identifying best matching candidate identifiers in social networking services are described. Reference will be made to certain embodiments, which are illustrated in the accompanying drawings.

Moreover, in the following description, numerous specific details are set forth to provide a thorough understanding. However, it will be apparent to one of ordinary skill in the art that various embodiments may be practiced without these particular details. In other instances, methods, procedures, components, and networks that are well-known to those of ordinary skill in the art are not described in detail to avoid obscuring other aspects of the described embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description of the embodiments herein is for the purpose of describing particular embodiments only and is not intended to be limiting of the claims. As used in the description herein and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As used herein, the term "URL" refers to a uniform resource locator, which is sometimes called a uniform resource identifier (URI).

As used herein, the term "identifier" refers to a word or set of words that is used to identify a user on one or more social networking services. For example, an identifier of a first user may be a real name (e.g., a first, last, or full name, with or without a middle name or middle initial), account name, username, or nickname of the first user. Generally, the identifier is selected by human, and thus, as used herein, the term "identifier" does not refer to an identifier that is originally generated by a machine (e.g., an index number assigned, to a user or information related to the user, by an automated machine for data access purposes).

FIG. 1 is a block diagram illustrating an example of distributed computer system 100, according to certain embodiments. In FIG. 1, the system 100 includes one or more client computers 102, communications network 106, and identifier system 108. Various embodiments of identifier system 108 implement the methods described in this document.

FIG. 1 also illustrates one or more social networking service servers 104 and at least one search engine 110 coupled with communications network 106. Social networking service servers 104 are servers that provide social networking services. For example, social networking service servers 104 provide services for sharing information (e.g., short messages, postings, web logs, comments, etc.) among social networking service users. Search engine 110 provides search results in response to search queries (e.g., a list of online documents and/or information that correspond to a respective search query).

Client computers 102 can be any of a number of computing devices (e.g., Internet kiosk, personal digital assistant, cell phone, gaming device, desktop computer, laptop computer, tablet computer, handheld computer, or combinations thereof) used to enable the activities described below. Client computer(s) 102 is also referred to herein as client(s) or client system(s). Client 102 typically includes graphical user interface (GUI) 111. Client 102 is described in greater detail below with reference to FIG. 3. Client 102 is connected to identifier system 108 via communications network 106. As described in more detail below, GUI 111 is used to display web documents. Identifier system 108 provides information to a server (e.g., search engine 110 and/or social networking service server 104) or client 102.

Identifier system 108 includes one or more servers, such as server 112, connected to the communications network 106. Optionally, the one or more servers are connected to the communications network 106 via a front end server 122. In some embodiments, front end server 122 conveys (and optionally parses) inbound requests to the appropriate server of identifier system 108, and formats responses and/or other information being sent to other servers or clients in response to requests. Front end server 122, if present, may be a web server providing web based access to identifier system 108. Front end server 122, if present, may also route communications to and from other destinations, such as a remote search engine.

Identifier system 108 typically includes a user information database 116 and a candidate identifier database 118. In some embodiments, identifier system 108 also includes or has access to one or more other databases, such as a web cache database (not shown), which maintains copies of web pages (e.g., web pages for social networking services). In some embodiments, server 112 includes candidate identifier module 114 and applications 128. Server 112 communicates with one or more databases internal to identifier system 108, such as user information database 116 and candidate identifier database 118 using a local area network, by internal communication busses, or by any other appropriate mechanism or combination of mechanism.

Server 112 is also referred to herein as a server system. Server 112 communicates with other servers (e.g., social networking service server(s) 104 and search engine(s) 110) and/or clients 102 via front end server 122 (if present) and communication network(s) 106. In some embodiments, communications network 106 is the Internet. In other embodiments, communication network 106 can be any local area network (LAN), wide area network (WAN), metropolitan area network, or a combination of such networks. In some embodiments, server 112 is used within an intranet, and thus it may be called an intranet server.

Applications 128 include application programs used for managing identifier system 108. In some embodiments, applications 128 include a user information processing module (not shown), where the user information processing module assists in accessing and updating user information database 116. User information database 116 stores various information associated with the users of identifier system 108, including users' real names, geography, etc. In some embodiments, user information database 116 also includes information about contacts, such as names, email addresses, and phone numbers of the contacts (e.g., 226, FIG. 2). In some embodiments, contacts may be stored in a separate contacts database (not shown).

Candidate identifier module 114 identifies candidate identifiers, and processes information related to the candidate identifiers to identify one or more best matching candidate identifiers. Candidate identifier module 114 typically stores data for operation of the candidate identifier module 114 in candidate identifier database 118. In some embodiments, candidate identifier database 118 includes a list of candidate identifiers and information about respective candidate identifiers, such as identifiers of friends or connections associated with the respective candidate identifiers.

In essence, server 112 is configured to manage certain aspects of identifier system 108, including handling requests for candidate identifiers from a respective server (e.g., social networking service server 104 or search engine 110) and/or respective client 102.

Optionally, identifier system 108 is implemented as part of search engine 110 or as part of social networking service server 104.

In some embodiments, fewer and/or additional modules, functions or databases are included in identifier system 108 and server 112. The modules shown in identifier system 108 and server 112 represent functions performed in certain embodiments.

Figure 2:
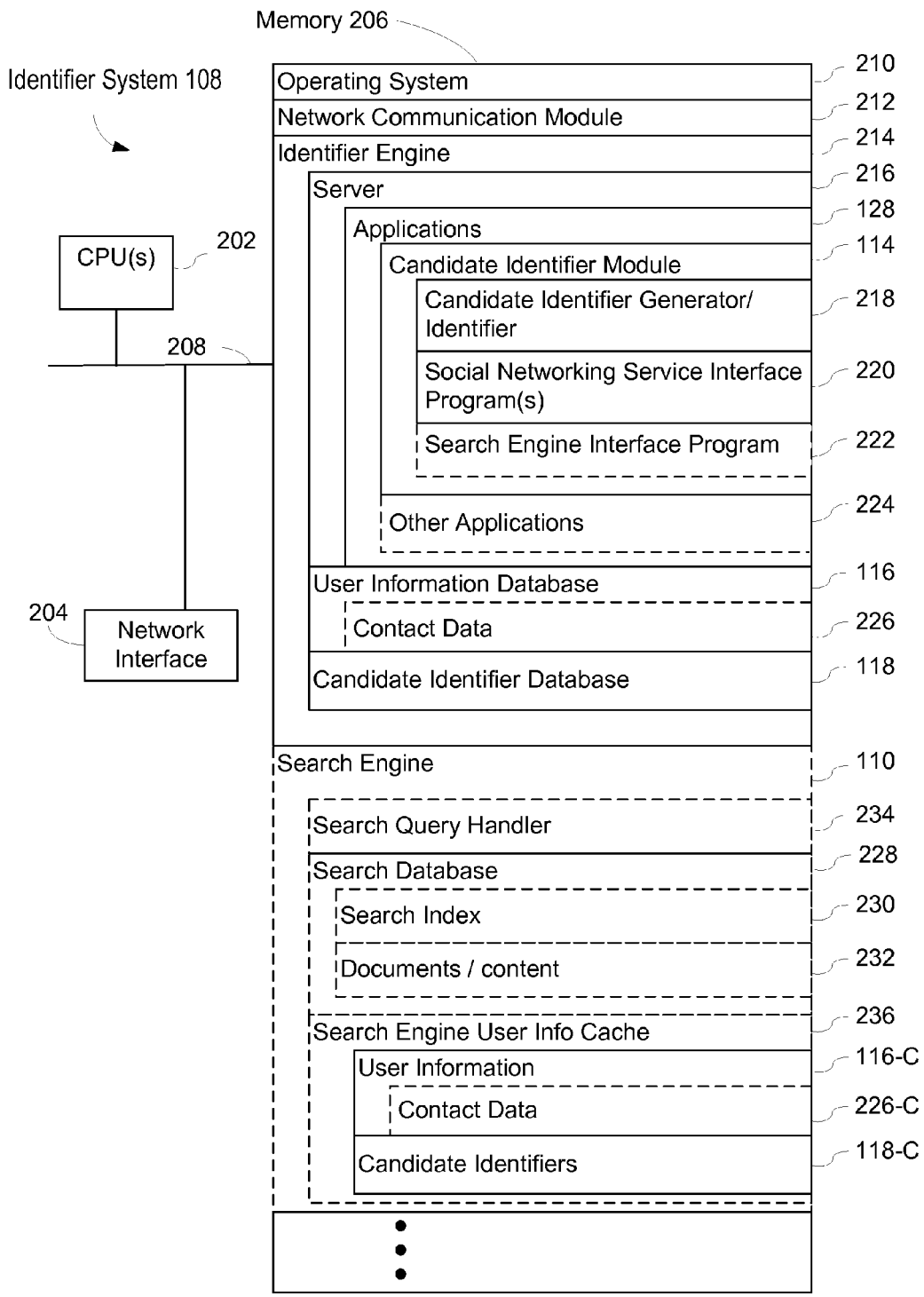
FIG. 2 is a block diagram illustrating an identifier system, in accordance with some embodiments.

FIG. 2 is a block diagram illustrating identifier system 108 in accordance with some embodiments. Identifier system 108 is typically implemented using a server system having one or one or more servers. More particularly, identifier system 108 typically includes one or more processing units (CPUs) 202, one or more network or other communications interfaces 204, memory 206, and one or more communication buses 208 for interconnecting these components. In some embodiments, communication buses 208 include circuitry (sometimes called a chipset) that interconnects and controls communications between system components. In some other embodiments, identifier system 108 includes a user interface (not shown) (e.g., a user interface having a display device, a keyboard, and a mouse or other pointing device), but more typically identifier system 108 is controlled from and accessed by various client systems.

Memory 206 of identifier system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from CPU(s) 202. Memory 206, or alternately the non-volatile memory device(s) within memory 206, comprises a non-transitory computer readable storage medium for storing information. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 212 that is used for connecting identifier system 108 to other computers (e.g., search engine 110, social networking service servers 104, and clients 102) via one or more communications interfaces 204 and one or more communications networks 106 (FIG. 1), such as the Internet, other wide area networks, local area networks, metropolitan area networks, and so on;
- Identifier Engine 214 that receives information requests from and provides responses to other computers (e.g., search engine 110, social networking service servers 104, and clients 102); and
- (Optional) Search Engine 110 that performs a search operation in response to a search query from client 102.

Figure 8:
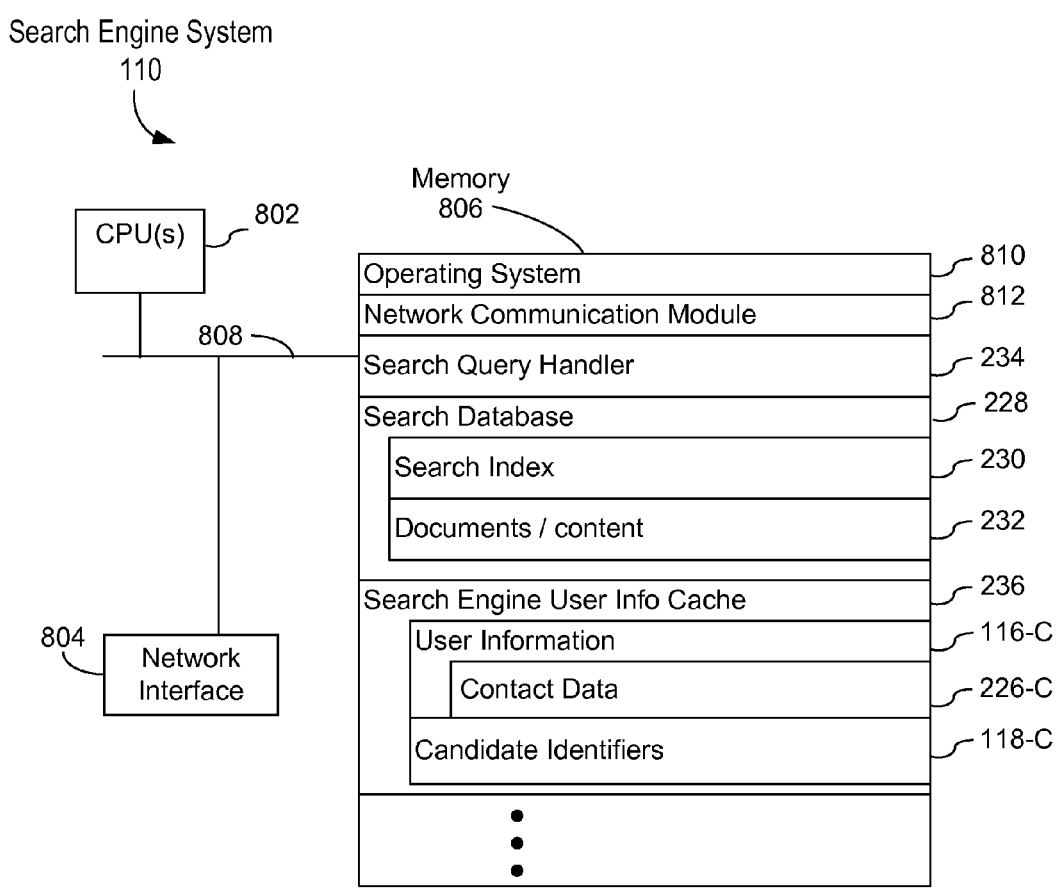
FIG. 8 is a block diagram illustrating a search engine system, in accordance with some embodiments.

In some embodiments, search engine 110 is implemented using a separate set of servers (see FIG. 8). In other embodiments, search engine 110 is implemented as part of identifier system 108 and includes:

- search database 228, including search index 230 (for mapping query terms to documents, and optionally locations within documents), and documents or content database 232 (storing the content indexed by search index 230);
- search query handler 234 (sometimes implemented by a front end server of a search engine system), for processing search queries received from users at client systems and responding to such search queries (see method 700, and operations 626-630 of process 600); and
- optionally, user information cache 236 (search engine user information cache) that stores portions of user information 116-C, optionally contact data 226-C, and candidate identifiers 118-C, for identifying social network sets of search results while processing respective search queries.

In some embodiments, identifier engine 214 includes the following programs, modules and data structures, or a subset or superset thereof:

- one or more server modules 216, corresponding to server 112 in FIG. 1, for managing certain aspects of identifier system 108;
- User information database 116 that stores records of users; and
- Candidate identifier database 118 that stores candidate identifiers and/or information associated with candidate identifiers (e.g., full name, geography, etc.).

In some embodiments, user information database 116 includes contact data 226. Contact data 226 includes contacts (e.g., address books) of a plurality of users. Contact data 226 is described in more detail below with reference to FIG. 4A.

In some embodiments, server module 216 includes applications 128. Applications 128 include candidate identifier module 114 for performing the primary functions of an identifier system. Applications 128 may optionally include other applications 224.

Candidate identifier module 114 includes candidate identifier generator/identifier program 218, social networking service interface program(s) 220, and optionally, search engine interface program(s) 222.

The candidate identifier generator/identifier program 218 generates or identifies candidate identifiers for a user. In some embodiments, candidate identifier generator/identifier program 218 stores the candidate identifiers in, and/or retrieves the candidate identifiers from, candidate identifier database 118.

Social networking service interface program(s) 220 assist sending to social networking service servers (e.g., 104, FIG. 1) requests for information corresponding to candidate identifiers, and receiving information from the social networking service servers.

Optional search engine interface program(s) 222 assist receiving requests for candidate identifiers from one or more search engines (e.g., 110, FIG. 1), and sending candidate identifiers to the one or more search engines.

In some embodiments, social networking service interface program(s) 220 include security protocols to retrieve information that are available to the user (i.e., information that the user has authority to access). In some embodiments, search engine interface program(s) 222 include security protocols to provide information only in response to authenticated requests (e.g., from an authorized search engine).

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Notwithstanding the discrete blocks in FIGS. 1 and 2, these figures are intended to be a functional description of some embodiments rather than a structural description of functional elements in the embodiments. One of ordinary skill in the art will recognize that an actual implementation might have the functional elements grouped or split among various components. In practice, and as recognized by those of ordinary skill in the art, items shown separately could be combined and some items could be separated. For example, in some embodiments, user information database 116 is part of or stored within server 112. In other embodiments, user information database 116 is implemented using one or more servers whose primary function is to store and process user information. In some embodiments, user information database 116 includes candidate identifier database 118, or vice versa.

The number of servers used to implement identifier system 108 and how features are allocated among them will vary from one implementation to another, and may depend in part on the amount of data traffic that the system must handle during peak usage periods as well as during average usage periods, and may also depend on the amount of data stored by identifier system 108. Moreover, one or more of the blocks (e.g., server 112, user information database 116, etc.) in FIG. 1 or FIG. 2 may be implemented on one or more servers designed to provide the described functionality. Although the description herein refers to a particular distribution of features between identifier system 108 and client 102 (and optionally search engine system 110), the embodiments are not limited to such distinctions. For example, features described herein as being part of server 112 can be implemented in whole or in part in client 102, and vice versa.

Figure 3:
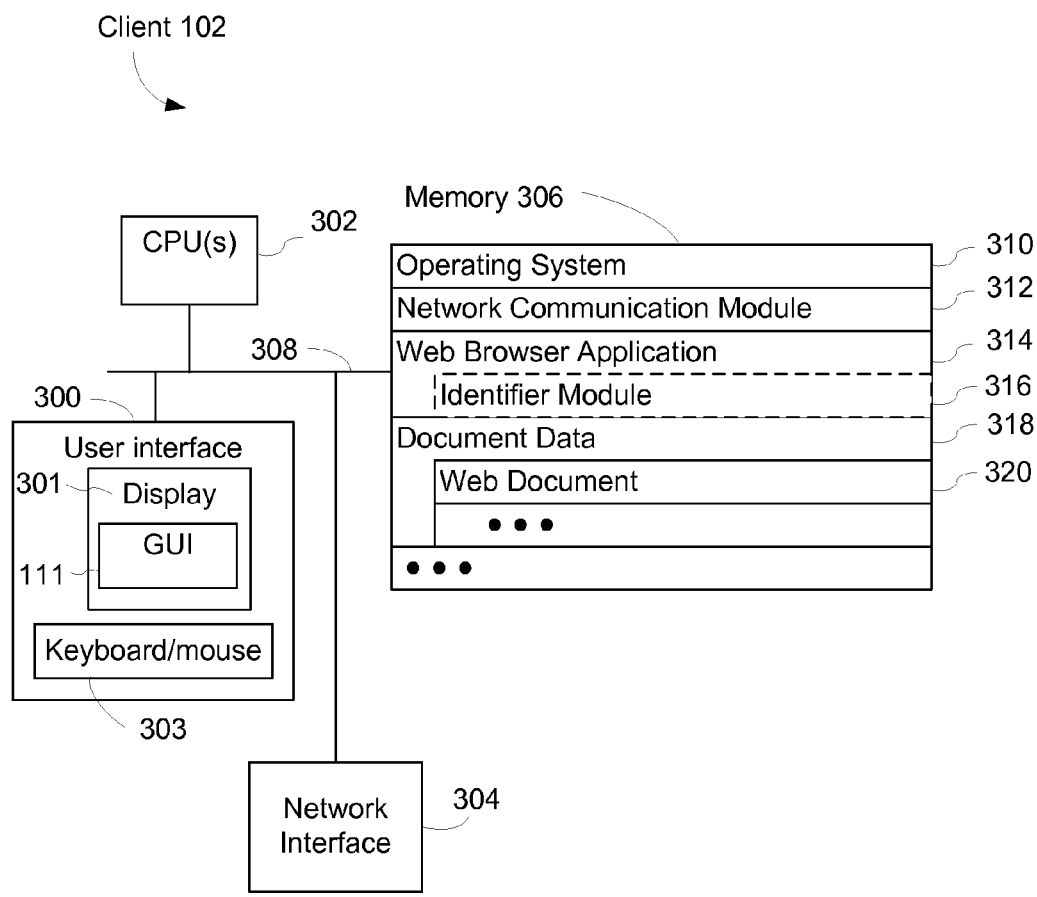
FIG. 3 is a block diagram illustrating a client, in accordance with some embodiments.

FIG. 3 is a block diagram illustrating client 102, also called a client system or client device, in accordance with some embodiments. Client 102 is configured for use by a subscriber (also herein called "the user") of one or more social network systems. Client 102 includes user interface 300, which typically includes display device 301, and one or more input devices 303 such as a keyboard and a mouse or other pointing device. As noted above, client 102 includes graphical user interface (GUI) 111, which is displayed on display device 301. Client 102 typically includes one or more processing units (CPUs) 302, one or more network or other network communications interfaces 304, memory 306, and one or more communication buses 308 for interconnecting these components. Communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from CPU(s) 302. Memory 306, or alternately the non-volatile memory device(s) within memory 306, comprises a non-transitory computer readable storage medium for storing information. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting client 102 to other computers (e.g., identifier system 108, search engine 110, social networking service server 104, and/or other clients 102) via one or more communications Network Interfaces 304 (wired or wireless) and one or more communication networks 106 (FIG. 1), such as the Internet, other wide area networks, local area networks, metropolitan area networks, and so on;
- Web Browser Application 314, which processes and initiates display of a web document (e.g., 320) in GUI 111; and
- Document Data 318, which includes web documents (e.g., 320, etc.).

In some embodiments, web browser application 314 or an extension, plug-in or toolbar of web browser application 314 includes identifier module 316 that sends requests for identification information from identifier system 108 (FIG. 1) and receives identifiers.

Respective web document 320 is typically a webpage (or XML document or the like) that can be displayed by client 102. In some circumstances, document 320 is a webpage received from identifier system 108. Respective web document 320 includes information for display in GUI 111. In some embodiments, respective web document 320 includes embedded instructions for receiving document-related input from a computer user (e.g., a request search results) and for formatting web document 320 for display in GUI 111. In other circumstances, document 320 is a webpage, received from a search engine, that lists search results responsive to a query submitted by a user of client 102 to the search engine.

Optionally, memory 306 includes additional other applications or components.

Figure 4A:
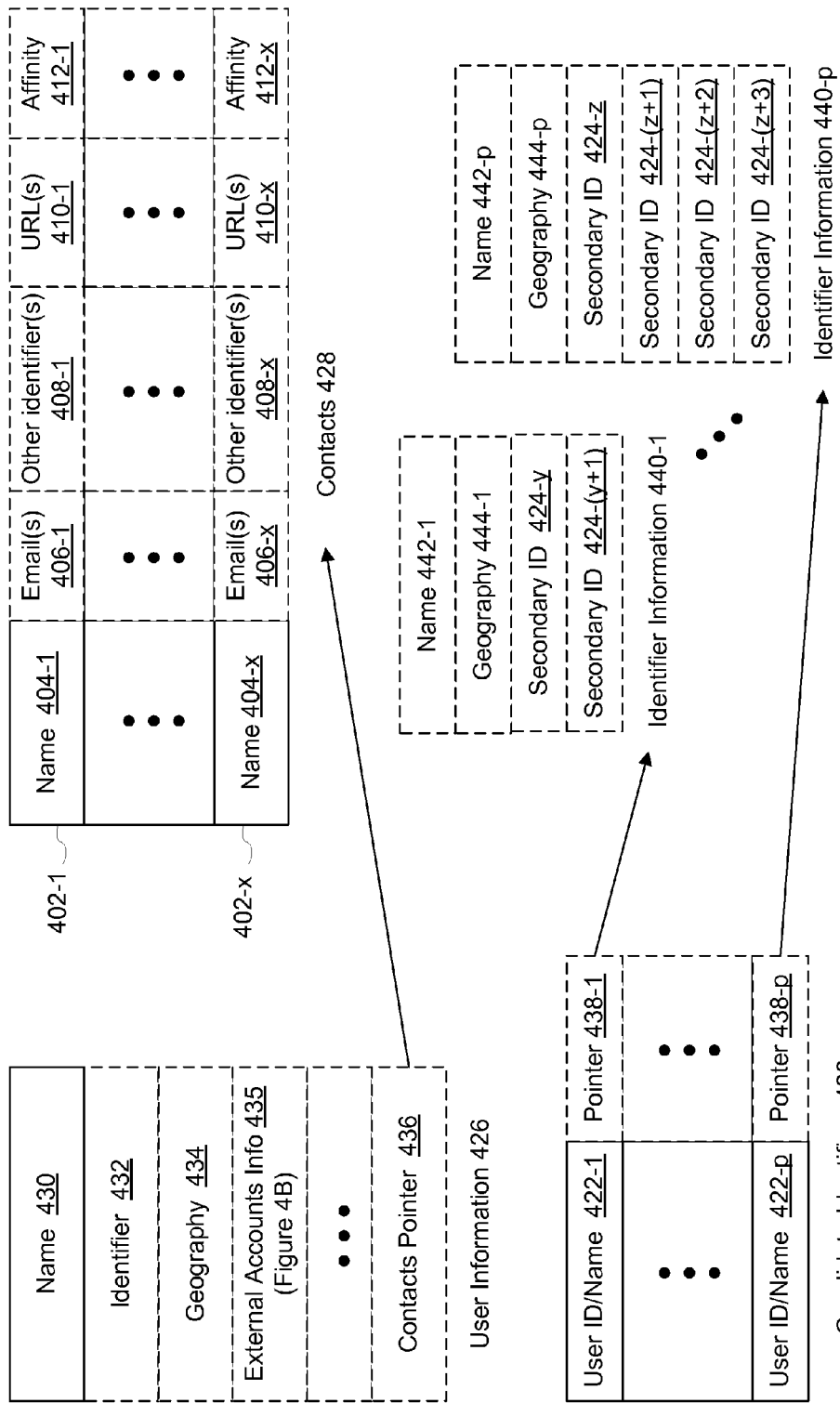
FIG. 4A is a block diagram illustrating examples of user information, contacts, and candidate identifiers, in accordance with some embodiments.

FIG. 4A is a block diagram illustrating examples of user information 426, contacts 428, and candidate identifiers 420, in accordance with some embodiments.

User information 426 is typically stored in user information database 116 (FIG. 2). User information 426 includes name 430 of a user (e.g., a real name), and optionally, additional information. The additional information may include one or more of: identifier 432 (e.g., an account name or an email address), geography 434 (e.g., city and state, or city and country, of the user's residence), and external accounts information 435, which is described below with respect to FIG. 4B. User information 426 typically includes contacts pointer 436 to contacts 428 that correspond to the user (e.g., a pointer to an address book data structure, containing contact or address book information of the user). In some embodiments, contacts are also stored in user information database 116 (e.g., contact data 226). In other embodiments, contacts are stored in a contacts database that is distinct from user information database 116.

Contacts 428 include contact entries, for example entry 1 (402-1) through entry x (402-x), where x represents the number of entries in contacts 428 of the user. A respective contact entry (e.g., entry 402-x) includes a field for storing a real name of respective contact 404-x, and optionally one or more of: email address(es) 406-x, other identifiers 408-x (e.g., account names other than email addresses 406-x), URL(s) 410-x of personal web page(s) (e.g., blogs), and affinity value 412-x for the respective contact.

In some embodiments, contacts 428 include entries that correspond to users that the user has added to the user's contacts (e.g., an address book of the user). In some embodiments, contacts 428 include entries that are generated automatically without human intervention. For example, in some embodiments the automatically generated entries correspond to users who have communicated with the respective user, and satisfy predefined criteria (e.g., frequency of communication).

Affinity value 412-x represents an importance and/or frequency of communication with the respective contact. Affinity value 412-x may be set by the user (e.g., by adding the respective contact to a particular group, such as "family," or by manually indicating that the respective contact is important). In some embodiments, affinity value 412-x is determined by a computer system without human intervention based on, for example, the frequency of communication between the user and the respective contact.

Candidate identifiers 420 include a list of candidate identifiers (e.g., 422-1 through 422-p). In some embodiments, the list of candidate identifiers is identified by candidate identifier generator/identifier program 218 of server 112 (FIG. 2). Respective candidate identifier 422 is a real name of a user, a username, or any other user identification information that may identify the user. Typically, respective candidate identifier 422 is a variation of the user's real name, or any other identifier that the user has used (e.g., an email address).

In some embodiments, respective candidate identifier 422 has associated pointer 438 that references respective set of identifier information 440. Typically, identifier information 440 is information publicly available about the respective candidate identifier. For example, identifier information 440 may include geography of a person who owns the respective candidate identifier (e.g., 444). In addition or instead, secondary information 440 may include secondary identifiers 424. Respective secondary identifier 424 is owned by a person who is associated with the owner of the respective candidate identifier. For example, secondary identifier 424-y may be a username for a friend or connection of the user who owns respective candidate identifier 422-1. In some implementations, identifier information 440 includes the real name of user 442 (e.g., because the candidate identifier is often not a real name of the user who owns particular candidate identifier 422.

In some embodiments, some respective candidate identifiers 422 have pointer 438 that includes a null value (i.e., the pointer is a null pointer that does not reference identifier information 440). The null pointer may be used when there is no identifier information for respective candidate identifier 422 (e.g., there is no user with a user name matching respective candidate identifier 422 on a respective online service).

FIG. 4B is a block diagram illustrating an example of external accounts information 435, in accordance with some embodiments. External accounts information 435 includes one or more external account identifiers 448 associated with identifier 432 (FIG. 4A). In other words, external account identifiers 448 identify other accounts (i.e., accounts other than the account corresponding to identifier 432, FIG. 4A) owned or used by the user of identifier 432 (FIG. 4A). Each external account identifier 448 typically includes an identifier (e.g., a username or account name used by another service provider, such as a third-party mail service provider, blog service provider, or messaging service provider). In some embodiments, a respective external account identifier (e.g., 448-1) is stored with one or more privacy settings 450 (e.g., 450-1). In some embodiments, the one or more privacy settings (e.g., 450-1) indicate whether the corresponding external account identifier (e.g., 448-1) is to be publicly associated with (e.g., displayed with) identifier 432 (FIG. 4A). For example, if enabled by privacy settings 450, a respective external account identifier may be displayed on a public profile of the user associated with identifier 432. In another example, when enabled by privacy settings 450, content authored by or annotated by the user when using identifier 448-1 is shared with users having a social network connection to the user associated with identifier 432. To protect the privacy of the user, one or more of privacy settings 450 may be set by default to prevent such information from being publically displayed or otherwise publicly associated with the user unless the user takes a positive action (e.g., selects a user interface object) to modify one or more of the privacy settings 450. For example, the user may perform actions to modify privacy settings 450 so that one or more of external account identifiers 448 are publically associated with the user, who is publically known to be associated with identifier 432.

FIGS. 5A-5D illustrate an example of user interfaces displayed at a client, in accordance with some embodiments.

FIG. 5A illustrates an example of user interface 500-A displayed in GUI 111 of client 102. User interface 500-A includes a search result page received when a user of client 102 submits a search query, "bbq" in this example. For ease of reference, the user of client 102 who submitted the search query is sometimes called the first user, as distinguished from other users who annotated or recommended search results shown to the first user. The search result page optionally indicates a user identifier, such as email address 506, "george.washington@usa.gov," associated with the first user (who submitted the search query and to whom the search result page was sent).

The search result page includes a search query "bbq," and a list of search results. More generally, the search query has one or more query terms, sometimes called keywords. The list of search results includes search results (e.g., 502-1 through 502-4) that correspond to the one or more query terms of the search query.

As illustrated in FIG. 5A, search result 502-2 includes annotation 504. Annotation 504 includes information that a particular user (e.g., Thomas Jefferson) shared a search result in the list with a user of a respective candidate identifier (e.g., gwashington on Twitter) Annotation 504 also includes the respective candidate identifier and a confirmation affordance for confirming that the first user (who submitted the search query) is the owner of the respective candidate identifier (e.g., "are you gwashington on Twitter?"). In some embodiments, the respective candidate identifier is identified in accordance with method 600 described with respect to FIGS. 6A and 6B. In some embodiments, the particular user (whose annotation 504 is displayed or noted) is a secondary user associated with the respective candidate identifier as determined in accordance with method 600. The identifier of the particular user is sometimes herein called a "candidate social contact identifier," indicating that the particular user is not yet known to be a social contact of the first user.

FIG. 5B illustrates an example of user interface 502-B displayed in response to the first user's confirmation that the first user is the owner of the respective candidate identifier (e.g., "gwashington" on Twitter). As explained below, information about the respective candidate identifier and/or other users associated with the respective candidate identifier (e.g., friends, connections, etc.) is used to modify content presented to the first user (e.g., by modifying what content is presented, the order in which content is presented, and/or modifying which annotations or other supplemental information is presented along with other (primary) content that is being presented). User interface 500-B includes a modified list of search results. User interface 500-B optionally includes user identifier 506 (e.g., the email address, george.washington@usa.gov) of the first user, who submitted the search query.

Similar to the list of search results shown in FIG. 5A, the modified list of search results includes search results (e.g., 502-1 through 502-4) that correspond to the search query submitted by the first user. However, in some embodiments, the modified list includes additional information not included in the list shown in FIG. 5A. In FIG. 5B, some of search results 502 each include an annotation that a particular user (e.g., Thomas Jefferson) shared a respective search result with the first user (e.g., with the user identified as "gwashington" on Twitter). For example, search result 502-4 includes an annotation that Thomas Jefferson shared search result 502-4 recently (e.g., 5 minutes ago).

FIG. 5B also illustrates that the relative positions of the search results in the modified list are adjusted from their original positions (e.g., the positions without adjustments, as shown in FIG. 5A). For example, search result 502-4, which Thomas Jefferson shared recently, is positioned at the top of (i.e., as the first item in) the modified list instead of being presented as the fourth item in the search result, as shown in FIG. 5A. In this example, search result 502-3, which no friend or connection of the user has shared, is positioned at the bottom of the modified list.

Figure 5C:

FIG. 5C illustrates another example of user interface 500-C displayed in GUI 111 of client 102. User interface 500-C includes a search result page that optionally indicates a user identifier, such as an email address, of the user who submitted the search request that corresponds to the search result page). The search result page includes a search query "bbq," and a list of search results. The list of search results includes search results (e.g., 502-5 and 502-6) that correspond to the search query. In some embodiments, every search result shown in the list of search results corresponds to a document that matches the search query, in accordance with predefine criteria.

Search result 502-5 includes an annotation. The annotation includes information that a particular user (e.g., Thomas Jefferson) shared a search result in the list. The annotation also includes confirmation affordance 508 for confirming that the first user (who submitted the search query and received the list of search results) is the owner of the respective candidate identifier (e.g., 510) (e.g., "are you gwashington?"). In some implementations, including the one shown in FIG. 5C, confirmation affordance 508 is located adjacent to the corresponding search result (e.g., 502-5). Confirmation affordance 508 includes respective candidate identifier 510 and, in some embodiments, image 512 associated with the respective candidate identifier (e.g., a photo of the owner of the respective candidate identifier). Confirmation affordance 508 typically includes user interface objects for the user to either confirm (e.g., "yes" 514) or deny (e.g., "no" 516) that he or she is the owner of the respective candidate identifier (e.g., 510).

As illustrated in FIG. 5C, in some circumstances, the list of search results includes a plurality of search results that are marked (or shared) by the same identified person (e.g., Thomas Jefferson shared search results 502-5 and 502-6), who is associated with a candidate identifier. In some embodiments, only one confirmation affordance is displayed for any one candidate identifier. In some implementations, the confirmation affordance for the candidate identifier is displayed with a best ranking search result among the plurality of search results that is marked (or shared) by any identified person associated with the candidate identifier. Furthermore, in some implementations the confirmation affordance is not displayed for any search result shared or annotated by a person who is already associated with a known identifier (e.g., any external account identifier) of the first user.

Alternatively, in some embodiments, only one confirmation affordance is displayed for any one candidate social contact identifier, even when the same person, having the candidate social contact identifier, has annotated, authored or shared more than one item in the displayed list of search results. In some embodiments, the confirmation affordance for the candidate social contact identifier is displayed with a best ranking search result among the plurality of search results that is marked (or shared) by the person having the candidate social contact identifier. Alternatively, the confirmation affordance may be displayed with each of two or more of the plurality of search results marked or shared by the person having the candidate social contact identifier.

FIG. 5D illustrates an example of user interface 502-D displayed in response to the user's confirmation that the user is the owner of the respective candidate identifier (e.g., "gwashington"). In some embodiments, the respective candidate identifier is identified in accordance with method 600 described with respect to FIGS. 6A and 6B. User interface 502-D continues to include the list of search results (e.g., 502-5 and 502-6) that correspond to the search query. Search result 502-5 includes confirmation message 520, which indicates that the respective candidate identifier (e.g., "gwashington") has been added to the user's account as an associated account identifier (e.g., the respective candidate identifier is stored in external account information 435 as a respective external account identifier 448, FIG. 4B). In some implementations, confirmation message 520 is located adjacent to the corresponding search result (e.g., 502-5). Also, as shown, confirmation message 520 is concurrently displayed with at least a subset of the list of search results.

In some embodiments, confirmation message 520 includes an "undo" user interface object 522, which when activated by user input initiates removing the respective candidate identifier from the user's account (e.g., the respective candidate identifier is removed from external account information 435, FIG. 4B).

In some embodiments, confirmation message 520 also includes "change account" user interface object 524, which when activated by user input initiates modifying the respective candidate identifier in the user's external account information 435. For example, the respective candidate identifier stored in external account information 435 is replaced with a different identifier provided by the first user. In some embodiments, a user interface that is configured to receive an alternative identifier from the user may be displayed in response to the user activating "change account" user interface object 524.

In some embodiments, confirmation message 520 includes "add to public profile" user interface object 526, which when activated by user input initiates adding the respective candidate identifier to a public profile of the user. In some implementations, adding the respective candidate identifier to the public profile includes modifying one or more privacy settings 450 (FIG. 4B) corresponding to the respective candidate identifier (now stored as a respective external account identifier 448 for the user) so that the public profile of the user (or a web page displaying the public profile of the user) includes the respective candidate identifier.

In accordance with some embodiments, a graphical user interface is displayed at a computer system having one or more processors and memory storing one or more programs for execution by the one or more processors. The graphical user interface (e.g., 500-C, FIG. 5C) includes: a list of search results (e.g., 502-5 and 502-6), including respective search results annotated by respective secondary users who are associated with one or more respective candidate identifiers of a user of the computer system (e.g., search results 502-5 and 502-6 are annotated by a secondary user, such as Thomas Jefferson, who is associated with one of candidate identifiers for the user, such as gwashington); and one or more confirmation affordances (e.g., 508). A respective confirmation affordance is for confirming that the user of the computer system is an owner of a corresponding candidate identifier, and the respective confirmation affordance includes a user interface object (e.g., user interface object 514) for selection (and thus activation) by the first user so as to make the confirmation. In response to receiving a user input activating the user interface object for confirmation, a confirmation message is displayed concurrently with at least a subset of the list of the search results (e.g., see search results 502-5 and 502-6, and confirmation message 520, FIG. 5D).

In some embodiments, the one or more confirmation affordances include, for a respective secondary user, only one confirmation affordance. For example, as illustrated in FIG. 5C, when the list of search results include two or more search results (e.g., 502-5 and 502-6) that are annotated by a same user (e.g., Thomas Jefferson), confirmation affordance 508 is displayed only once.

In some embodiments, the one or more confirmation affordances include, for a respective candidate identifier, only one confirmation affordance. For example, when multiple authors who have annotated the displayed search results are associated with a same candidate identifier (e.g., gwashington), a confirmation affordance (e.g., 508) is displayed only once for that candidate identifier.

In some embodiments, the one or more displayed confirmation affordances include only one confirmation affordance (e.g., only one confirmation affordance is displayed in any one user interface that presents search results). In some embodiments, the one displayed confirmation affordance includes a candidate identifier that has a highest likelihood of being owned by the user, in accordance with predefined criteria. In some embodiments, the one displayed confirmation affordance corresponds to a search result that is most relevant to the search query and/or the user.

In some embodiments, at least one of the one or more confirmation affordances is replaced with a confirmation message in the graphical user interface. In some embodiments, at least one of the one or more confirmation affordances is replaced with the confirmation message in the graphical user interface in response to receiving the user input activating a user interface object for confirmation. For example, confirmation affordance 508 (FIG. 5C) is replaced with confirmation message 520 (FIG. 5D) in response to receiving the user input activating the user interface object for confirmation 514 (FIG. 5C).

In some embodiments, all of the one or more confirmation affordances are replaced with the confirmation message. In other words, in these embodiments no confirmation affordances remain on display when the confirmation message is displayed.

In some embodiments, the confirmation message includes an undo user interface object (e.g., "undo" user interface object 522, FIG. 5D), and in response to receiving a user input activating the undo user interface object, a request to disassociate the respective candidate identifier with the user is sent to a server (e.g., a request to remove the respective candidate identifier from external accounts information 435, FIG. 4B, is sent to the server).

In some embodiments, the confirmation message includes a user interface object for updating account information (e.g., user interface object 524, FIG. 5D), and in response to receiving a user input activating the user interface object for updating account information, a request for a user interface that is configured for updating account information is sent to a server. For example, the client system may receive and display a web page for updating account information of the first user in response to sending the request.

In some embodiments, the confirmation message includes a user interface object for updating a public profile of the user (e.g., user interface object 526, FIG. 5D), and in response to receiving a user input activating the user interface object for updating the public profile of the user, a request to update the public profile of the user is sent to a server (e.g., a request to update privacy settings 450, FIG. 4B, corresponding to the respective candidate identifier is sent to the server).

Figure 6A:
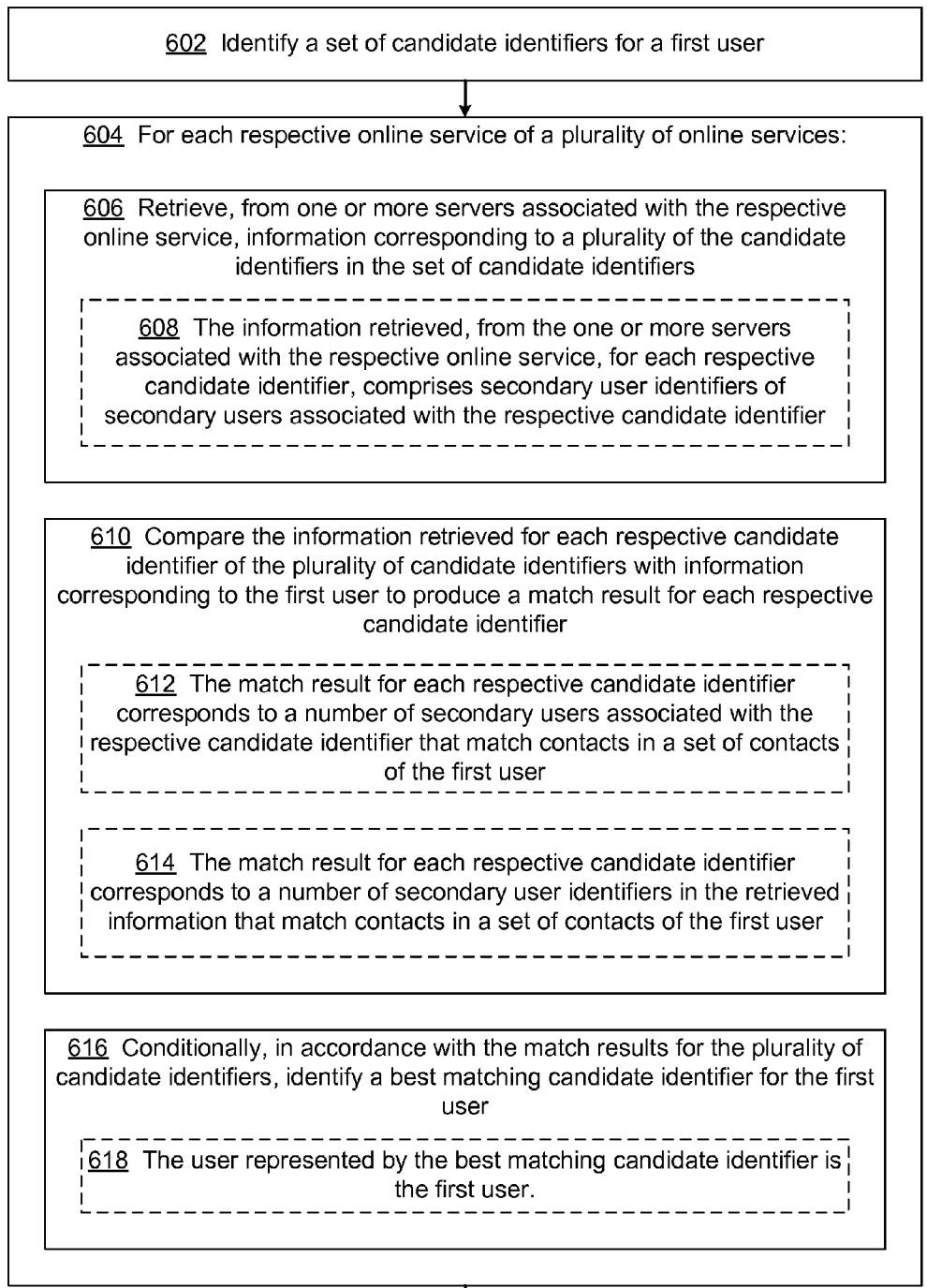
FIGS. 6A-6B are flowcharts representing a method of identifying best matching candidate identifiers, in accordance with some embodiments.
Figure 6B:
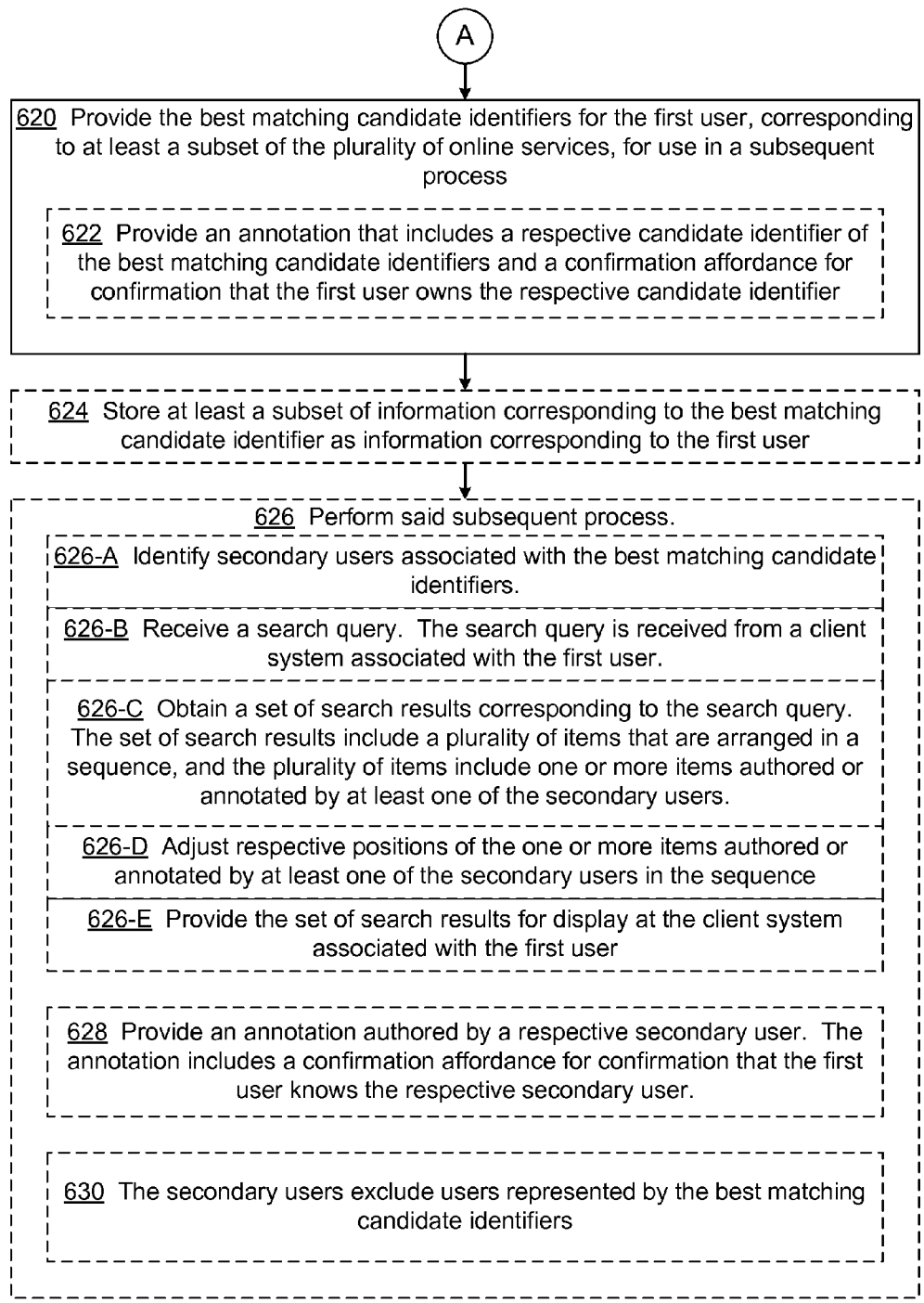

FIGS. 6A-6B are flowcharts representing method 600 of identifying best matching candidate identifiers, in accordance with some embodiments. The method is performed at a server system having one or more processors and memory storing one or more programs for execution by the one or more processors (e.g., identifier system 108).

The server system identifies (602) a set of candidate identifiers for a first user. In some embodiments, the set of candidate identifiers are generated in accordance with predefined set of rules. In some embodiments, the set of candidate identifiers includes variations of a full name, email address, and/or other usernames or identifiers of the first user. For example, when the first user has a full name of "George Adam Washington," the following table shows examples of candidate identifiers.

| Rule | Example |
| --- | --- |
| (first name + last name) | georgewashington |
| (first name + middle name + last name) | georgeadamwashington |
| (first name + middle initial + last name) | georgeawashington |

| Rule | Example |
| --- | --- |
| (last name + first name) | washingtongeorge |
| (last name + middle name + first name) | washingtonadamgeorge |
| (last name + middle initial + first name) | washingtonageorge |
| (first name initial + last name) | gwashington |
| (last name + first name initial) | washingtong |
| (first name + last name initial) | georgew |
| (last name initial + first name) | wgeorge |
| (first name initial + middle initial + last name) | gawashington |
| (last name + middle initial + first name initial) | washingtonag |
| (first name + middle initial + last name initial) | georgeaw |
| (last name initial + middle initial + first name) | wageorge |

In some embodiments, the set of candidate identifiers includes parts of the user's names (e.g., first name, middle name, last name, or initials) separated by a separator (e.g., a period, dash, underscore, or any other predefined character). For example, the set may include "george.a.washington" and/or "g.a.washington".

For each respective online service of a plurality of online services (e.g., social networking services) (604), the server system retrieves (606), from one or more servers associated with the respective online service (e.g., social networking service server 104, FIG. 1), information corresponding to a plurality of the candidate identifiers in the set of candidate identifiers. In some embodiments, the server system requests information corresponding to at least a subset of the candidate identifiers from each respective online service, and receives information, if any, from the respective online service. The server system repeats these operations for a plurality of online services. For example, the server system sends to one or more servers of a social networking service X a request for information about "georgewashington," "gwashington," "gawashington," etc., and receives the response. Then the server system makes a similar or same request to one or more servers of a social networking service Y. The server system repeats these operations for remaining online services in the plurality of online services.

Typically, information received by the server system is information that a respective owner of the corresponding identifier (e.g., an owner of the account "georgewashington" at the social networking service X) has decided to share with the public. For example, the respective owner may "opt-in" to share the respective owner's full name, geography/location (e.g., city and state), and/or a list of connections. As such, in some embodiments, the information retrieved from one or more servers associated with the respective online service include a full name, geography, and/or a list of connections.

In some embodiments, the information retrieved, from the one or more servers associated with the respective online service, for each respective candidate identifier, comprises (608) secondary user identifiers (e.g., real names and/or usernames) of secondary users associated with the respective candidate identifier. In some embodiments, the secondary users are associated with the first user (e.g., friends or connections of the first user on the respective online service). For example, the information retrieved for "gwashington" on Twitter may include secondary user identifiers, "Thomas Jefferson" and "John Adams" who are friends or connections of George Washington (FIGS. 5A-5B).

The server system compares (610) the information retrieved for each respective candidate identifier of the plurality of candidate identifiers with information corresponding to the first user to produce a match result for each respective candidate identifier. For example, the server system may compare the full name of each respective candidate identifier and the full name of the first user (e.g., 442 and 430, FIG. 4A). Additionally, or alternatively, the server system may also compare the geography of each respective candidate identifier and the geography of the first user (e.g., 444 and 434, FIG. 4A). In some embodiments, the match result indicates that there is an exact match. However, the match result typically does need to be an exact match. For example, in some embodiments, the match result indicates that a substring of information for the first user is included in information for the respective candidate identifier (e.g., a portion of a name), or vice versa.

In some embodiments, the server system compares friends/connections (e.g., 424, FIG. 4A) of the respective candidate identifier with contacts of the first user. In some embodiments, the server system makes the comparison (of two respective contacts, one being a contact of the respective candidate identifier and the other a contact of the first user) based on one of more of: name 404 (FIG. 4A), email address 406, other identifier(s) 408, and URL(s) 410 (e.g., a unique identifier in a web log URL) of the respective contact. In other words, the server system identifies variations of name 404, email address 406, other identifier(s) 408, and URL(s) 410 of a particular contact and compares the variations with the identifiers for friends/connections of the respective candidate identifier. This comparison operation is particularly beneficial when the first user has a common name and resides in a high population area. In such cases the name and geography information may not be sufficient to distinguish one person from another person with the same or similar name in the same geographic area. Then, information about who each person knows can be used to distinguish two people with otherwise similar profiles (e.g., the same name and the same geographic area).

In some embodiments, the match result for each respective candidate identifier corresponds (612) to a number of secondary users associated with the respective candidate identifier that match contacts in a set of contacts of the first user. For example, the match result indicates how many of the secondary users (e.g., Thomas Jefferson and Adam Smith) are contacts of the first user. In some embodiments, the match result corresponds to a number of secondary users that match a subset of contacts of the first user (e.g., close contacts or important contacts, selected by the first user or determined based on the frequency of communication).

In some embodiments, the match result for each respective candidate identifier corresponds (614) to a number of secondary user identifiers in the retrieved information that match contacts in a set of contacts of the first user. For example, the match result indicates how many secondary user identifiers in the retrieved information (e.g., "tjefferson" and "asmith") match contacts of the first user. In some embodiments, the match result corresponds to a number of secondary user identifiers that match a subset of contacts of the first user.

The server system conditionally, in accordance with the match results for the plurality of candidate identifiers, identifies (616) a best matching candidate identifier for the first user (e.g., for each respective online service 604). In some embodiments, the best matching candidate identifier is an exact match of the first user (e.g., the full name and geography of the best matching candidate identifier is the full name and geography of the first user). In some embodiments, the best matching candidate identifier is identified based on a scoring algorithm, and the best matching candidate identifier is a candidate identifier with the best score. In some embodiments, the server system identifies the best matching candidate identifier for the first user based on a predefined score threshold (e.g., a candidate identifier with the best score that exceeds the predefined score threshold). As a result, the server system may not identify any best matching candidate identifier in some cases (e.g., the scores of candidate identifiers do not exceed the predefined score threshold). It is noted that a result of no best matching candidate identifier is particularly appropriate, with respect to a particular online service, in cases in which the first user does not have account with the online service. For example, while method 600 may look for best matching candidates with respect to N (e.g., several dozen) online services, the first user may in fact have accounts at only a subset of those online services. Thus, it is desirable for the method 600 to avoid false positive results.

In some embodiments, the best matching candidate identifier is identified based on the number of secondary users, or secondary user identifiers, that match contacts of the first user. In some embodiments, the best matching candidate identifier is identified based on the number of matching secondary users or secondary user identifiers and the number of contacts in the set of contacts of the first user. For example, between a first candidate identifier that has 5 matching secondary user identifiers out of 10 secondary user identifiers (i.e., 50% match) and a second candidate identifier that has 5 matching secondary user identifiers out of 50 secondary user identifiers (i.e., 10% match), the first candidate identifier (that has a higher percentage of match) is identified as the best matching candidate identifier.

Ideally, when method 600 is well implemented, the user represented by the best matching candidate identifier is (618) the first user. In other words, the first user is the owner of the best matching candidate identifier.

The server system provides (620) the best matching candidate identifiers for the first user, corresponding to at least a subset of the plurality of online services, for use in a subsequent process. For example, the server system provides the best matching candidate identifiers to search engine 110 (FIG. 1), social networking service server 104, and/or client 102 for a subsequent process.

In some embodiments, the server system provides (622) an annotation that includes a respective candidate identifier of the best matching candidate identifiers and a confirmation affordance for confirmation that the first user owns the respective candidate identifier. For example, annotation 504 in FIG. 5A includes a best matching candidate identifier (e.g., "gwashington" on Twitter) and a confirmation affordance (e.g., "are you gwashington on Twitter?").

In some embodiments, the server system stores (624) at least a subset of information corresponding to the best matching candidate identifier as information corresponding to the first user. For example, in accordance with a user confirmation that the first user owns the best matching candidate identifier, the server system may add the secondary users of the best matching candidate identifier to the contacts of the first user. Alternatively, the server system may add a link to postings by the best matching candidate identifier on the respective online service on a web page owned by the first user (e.g., the first user's home page or primary social network page). In some embodiments, the server system initiates storing at least a subset of information corresponding to the best matching candidate identifier in one or more servers for an online service distinct from the respective online service (e.g., the server system initiates copying information to the first user's primary social networking service).

In some embodiments, the server system includes a search engine (e.g., search engine 110, FIG. 2) or the server system is coupled with a search engine (e.g., FIG. 1). In some embodiments, the server system that includes the search engine or the search engine coupled with the server system performs (626) said subsequent process. The subsequent process includes (626-A) identifying secondary users associated with the best matching candidate identifiers (e.g., the server system finds secondary identifiers 424 (FIG. 4A) of friends, or users having a social connection with the respective user(s) who correspond to the best matching candidate identifiers).

The subsequent process includes (626-B) receiving a search query. The search query from a client system is associated with the first user (e.g., 102, FIG. 1). For example, the search query "bbq" in FIG. 5B is associated with user identifier 506 (e.g., the email address, george.washington@usa.gov) of the first user.

The subsequent process includes (626-C) obtaining a set of search results corresponding to the search query. The set of search results includes a plurality of items that are arranged in a sequence (e.g., search results 502, FIG. 5A), and the plurality of items includes one or more items authored or annotated by at least one of the secondary users (e.g., posts authored by friends or items annotated by friends, such as search result 502-2 shared by a secondary user, Thomas Jefferson, FIG. 5A).

In some embodiments, the subsequent process includes (626-D) adjusting respective positions of the one or more items authored or annotated by at least one of the secondary users in the sequence (e.g., boost the posts authored by the friends or items annotated by the friends, such as search result 502-4, FIG. 5B).

The subsequent process includes (626-E) providing the set of search results for display at the client system associated with the first user. In some embodiments, search engine 110 in the server system (FIG. 2) or the search engine coupled with the server system (FIG. 1) sends the set of search results to the client (e.g., 102).

In some embodiments, the server system provides (628) an annotation authored by a respective secondary user (e.g., a snippet of a posting/annotation authored by the respective secondary user or an indication that the respective secondary user has annotated a particular item, such as "Thomas Jefferson has shared this"). The annotation includes a confirmation affordance for confirmation that the first user knows the respective secondary user (e.g., "do you know Thomas Jefferson on Twitter?"). In some embodiments, in accordance with a user confirmation that the first user knows the respective secondary user, the contacts (e.g., 428, FIG. 4A) of the first user are updated (e.g., the respective secondary user is added to the contacts of the first user, or a contact of the first user that corresponds to the respective secondary user is updated to include the identifier of the respective secondary user for the respective online service).

In some embodiments, the secondary users exclude (630) users represented by the best matching candidate identifiers. For example, the secondary users are friends/connections of respective users represented by the best matching candidate identifiers, but not the respective users themselves.

FIG. 7 is a flowchart representing method 700 of identifying a social network set of search results, in accordance with some embodiments. The method is performed at a server system having one or more processors and memory storing one or more programs for execution by the one or more processors. In some embodiments, method 700 is performed by search engine system 110, one embodiment of which is shown in FIG. 8, or in a server system that includes a search engine, as shown in FIG. 2.

The server system receives (702) a search query from a client system (e.g., client 102, FIG. 1) associated with a first user. Operations 704, 706 and 714, and optionally one of more of operations 708, 710, 712, are performed by the server system in response to receiving the search query. Prior to the performance of method 700, user information for the first user, as described above with respect to FIGS. 4A and 4B, has been gathered and stored in a user information database or the like. In addition, prior to performance of method 700, a set of candidate identifiers has been identified or determined for the first user and stored in a database or the like.

The server system obtains (704) one or more candidate identifiers associated with the first user (e.g., the set of candidate identifiers for the first user or the best matching candidate identifier from method 600).

The server system identifies (706) a social network set of search results matching the search query and social network criteria for the first user. The social network criteria is satisfied for a respective search result when the respective search result is authored or annotated (e.g., shared or otherwise annotated) by one or more people (or more generally, entities) having author identifiers, and at least one author identifier of the one or more author identifiers is associated with (e.g., in a social circle or network with) at least one candidate identifier of the one or more candidate identifiers associated with the first user. For example, in FIG. 5C, search result 502-5 satisfies the social network criteria, because search result 502-5 is annotated (e.g., shared) by a user, Thomas Jefferson, who is associated with an identifier, gwashington, and the identifier is a candidate identifier for the user, George Washington.

In some embodiments, the social network set of search results includes (708) a first set of search results authored or annotated by one or more author identifiers associated with at least one candidate identifier of the one or more candidate identifiers associated with the first user, and further includes a second set of search results authored or annotated by one or more author identifiers associated with at least one known identifier of the first user. For example, the social network set of search results include search results authored by both authors associated with an owner of a candidate identifier (who may or may not be the first user) and authors associated with the first user.

In some implementations, in response to receiving the search query, the server system identifies (710) a list of search results (which includes the social network set of search results) that match the received search query by identifying a third set of search results matching the search query without regard to the social network criteria, identifying search results (i.e., the social network set of search results) within the third set of search results that match the social network criteria for the first user, and applying ranking criteria to search results in the third set of search result such that the ranks of search results that match the social network criteria for the first user are boosted.

In some other implementations, in response to receiving the search query, the server system identifies a list of search results (which includes the social network set of search results) that match the received search query by identifying a third set of search results matching the search query without regard to the social network criteria, and identifying search results (i.e., the social network set of search results) within the third set of search results that match the social network criteria for the first user without adjusting the ranking criteria based on whether the search results match the social network criteria.

In some implementations, applying ranking criteria includes computing a score for each search result in the first set of search results. In some implementations, the score includes a social networking factor that has a default value for results that do not match the social network criteria for the first user and that has a value other than the default value for results that do match the social network criteria for the first user. In some embodiments, the social networking factor's value takes into account the degree of affinity between the annotator (or the owner of the corresponding author identifier) and the first user (e.g., affinity 412, FIG. 4A).

In some implementations, in response to receiving the search query, the server system identifies (712) a list of search results (which includes the social network set of search results) that match the received search query by identifying a third set of search results matching the search query without regard to the social network criteria, identifying the social network set of search results (see 706 and optionally 708), and merging at least a portion of the third set of search results and the social network set of search results to generate the list of search results.

The server system provides (714) to the client system the aforementioned list of search results, which includes at least a subset of the social network set of search results.

FIG. 8 is a block diagram illustrating search engine system 110 in accordance with some embodiments. Search engine system 110 is typically implemented using a server system having one or one or more servers. More particularly, search engine system 110 typically includes one or more processing units (CPUs) 802, one or more network or other communications interfaces 804, memory 806, and one or more communication buses 808 for interconnecting these components. In some embodiments, communication buses 808 include circuitry (sometimes called a chipset) that interconnects and controls communications between system components. In some other embodiments, search engine system 110 includes a user interface (not shown) (e.g., a user interface having a display device, a keyboard, and a mouse or other pointing device), but more typically search engine system 110 is controlled from and accessed by various client systems.

Memory 806 of search engine system 110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from CPU(s) 202. Memory 806, or alternately the non-volatile memory device(s) within memory 806, comprises a non-transitory computer readable storage medium for storing information. In some embodiments, memory 806 or the computer readable storage medium of memory 806 stores the following programs, modules and data structures, or a subset thereof:

- Operating System 810 that includes procedures for handling various basic system services and for performing hardware dependent tasks;
- Network Communication Module (or instructions) 812 that is used for connecting search engine system 110 to other computers (e.g., identifier system 108, social networking service servers 104, and clients 102) via one or more communications interfaces 804 and one or more communications networks 106 (FIG. 1), such as the Internet, other wide area networks, local area networks, metropolitan area networks, and so on;
- search database 228, including search index 230 (for mapping query terms to documents, and optionally locations within documents), and documents or content database 232 (storing the content indexed by search index 230);
- search query handler 234 (sometimes implemented by a front end server of a search engine system), for processing search queries received from users at client systems and responding to such search queries (see method 700, and operations 626-630 of process 600); and optionally, user information cache 236 (search engine user information cache) that stores portions of user information 116-C, optionally contact data 226-C, and candidate identifiers 118-C, for identifying social network sets of search results while processing respective search queries.

Notwithstanding the discrete blocks in FIG. 8, this figure is intended to be a functional description of some embodiments rather than a structural description of functional elements in the embodiments. One of ordinary skill in the art will recognize that an actual implementation of a search engine system might have the functional elements grouped or split among various components. In practice, and as recognized by those of ordinary skill in the art, items shown separately could be combined and some items could be separated.

The number of servers used to implement search engine system 110 and how features are allocated among them will vary from one implementation to another, and may depend in part on the amount of data traffic that the system must handle during peak usage periods as well as during average usage periods, and may also depend on the amount of data stored by search engine system 110. Moreover, one or more of the blocks (e.g., search query handler 234, search database 228, etc.) in FIG. 8 may be implemented on one or more servers designed to provide the described functionality. Although the description herein refers to certain features implemented in identifier system 108 and certain features implemented in search engine system 110, the embodiments are not limited to such distinctions. For example, features described herein as being part of search engine system 110 can be implemented in whole or in part in identifier system 108 or social network service server 104, and vice versa.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, performed at a server system having one or more processors and memory storing one or more programs for execution by the one or more processors, comprising:
   receiving a search query from a first user;
   obtaining a plurality of candidate identifiers representing the first user, wherein the plurality of candidate identifiers is generated using all or a portion of a name of the first user;
   providing the first user with a query as to whether they are associated with a first candidate identifier in the plurality of candidate identifiers including:
      (i) providing the first user with an annotation comprising an identification of a second user and a first affordance to confirm the first candidate identifier when the first user selects the affordance;
      (ii) detecting selection of the first affordance; and
      (iii) in response to detecting selection of the first affordance, confirming the first candidate identifier is associated with the first user;
   identifying a social network set of search results that (i) matches the search query and (ii) satisfies a social network criteria for the first user, wherein:
      the social network criteria is satisfied for a respective search result when the respective search result is annotated by the second user, distinct from the first user, represented by one or more author identifiers, and
      at least one author identifier of the one or more author identifiers represents the second user and is associated, in a social network application, with the confirmed first candidate identifier;
   identifying a particular social network application on which the first user and the second user are potentially connected; and
   formatting for concurrent presentation to the first user:
      (i) a search result, in the social network set of search results, published on the particular social network application by the second user, and
      (ii) information identifying the particular social network application.

2. The method of claim 1, wherein the social network set of search results includes:
   a first set of search results authored or annotated by one or more author identifiers associated with at least one candidate identifier of the plurality of candidate identifiers associated with the first user, and
   a second set of search results authored or annotated by one or more author identifiers associated with at least one known identifier of the first user.

3. The method of claim 1, wherein the social network set of search results comprises:
   a first set of search results matching the search query without regard to the social network criteria.

4. The method of claim 1, wherein identifying the social network set of search results matching the search query and social network criteria for the first user comprises:
   identifying a first set of search results matching the search query without regard to the social network criteria;
   identifying search results within the first set of search results that match the social network criteria for the first user; and
   applying ranking criteria to the search results in the first set of search result such that a rank of each search result that matches the social network criteria for the first user is boosted.

5. A server system, comprising one or more processors and memory storing one or more programs for execution by the one or more processors, the one or more programs including instructions, which when executed by the one or more processors, cause the server system to:
   receive a search query from a first user;
   obtain a plurality of candidate identifiers representing the first user, wherein the plurality of candidate identifiers is generated using all or a portion of a name of the first user;
   provide the first user with a query as to whether they are associated with a first candidate identifier in the plurality of candidate identifiers including:
      (i) provide the first user with an annotation comprising identification of a second user and a first affordance to confirm the first candidate identifier when the first user selects the affordance;
      (ii) detect selection of the first affordance; and
      (iii) in response to detecting selection of the first affordance, confirm the first candidate identifier is associated with the first user;

identify a social network set of search results that (i) matches the search query and (ii) satisfies a social network criteria for the first user,
    wherein the social network criteria is satisfied for a respective search result when the respective search result is annotated by the second user, distinct from the first user, represented by one or more author identifiers, and
    at least one author identifier of the one or more author identifiers represents the second user and is associated, in a social network application, with the confirmed first candidate identifier;
identify a particular social network application on which the first user and the second user are potentially connected; and
formatting for concurrent presentation to the first user:
    (i) a search result, in the social network set of search results, published on the particular social network application by the second user, and
    (ii) information identifying the particular social network application.

6. The server system of claim 5, wherein the social network set of search results includes:
    a first set of search results authored or annotated by one or more author identifiers associated with at least one candidate identifier of the plurality of candidate identifiers associated with the first user, and
    a second set of search results authored or annotated by one or more author identifiers associated with at least one known identifier of the first user.

7. The server system of claim 5, wherein the social network set of search results further comprises:
    a first set of search results matching the search query without regard to the social network criteria.

8. The server system of claim 5, wherein the instructions to identify the social network set of search results matching the search query and social network criteria for the first user comprise instructions to:
    identify a first set of search results matching the search query without regard to the social network criteria;
    identify search results within the first set of search results that match the social network criteria for the first user; and
    apply ranking criteria to the search results in the first set of search result such that a rank of each search result that matches the social network criteria for the first user is boosted.

9. A non-transitory computer readable storage medium, storing one or more programs for execution by one or more processors of a server system, the one or more programs including instructions, which when executed by the one or more processors, cause the server system to:
    receive a search query from a first user;
    obtain a plurality of candidate identifiers representing the first user, wherein the plurality of candidate identifiers is generated using all or a portion of a name of the first user;
    provide the first user with a query as to whether they are associated with a first candidate identifier in the plurality of candidate identifiers including:
        (i) provide the first user with an annotation comprising identification of a second user and a first affordance to confirm the first candidate identifier when the first user selects the affordance;
        (ii) detect selection of the first affordance; and
        (iii) in response to detecting selection of the first affordance, confirm the first candidate identifier is associated with the first user;
    identify a social network set of search results that (i) matches the search query and (ii) satisfies a social network criteria for the first user, wherein:
        the social network criteria is satisfied for a respective search result when the respective search result is annotated by the second user, distinct from the first user, represented by one or more author identifiers, and
        at least one author identifier of the one or more author identifiers represents the second user and is associated, in a social network application, with the confirmed first candidate identifier; and
    identify a particular social network application on which the first user and the second user are potentially connected; and
    format for concurrent presentation to the first user:
        (i) a search result, in the social network set of search results, published on the particular social network application by the second user, and
        (ii) information identifying the particular social network application.

10. The non-transitory computer readable storage medium of claim 9, wherein the social network set of search results includes:
    a first set of search results authored or annotated by one or more author identifiers associated with at least one candidate identifier of the plurality of candidate identifiers associated with the first user, and
    a second set of search results authored or annotated by one or more author identifiers associated with at least one known identifier of the first user.

11. The non-transitory computer readable storage medium of claim 9, wherein the social network set of search results further comprises:
    a first set of search results matching the search query without regard to the social network criteria.

12. The non-transitory computer readable storage medium of claim 9, wherein the instructions, which when executed by the one or more processors, cause the server system to identify a social network set of search results matching the search query and social network criteria for the first user comprise instructions, which when executed by the one or more processors, cause the computer system to:
    identify a first set of search results matching the search query without regard to the social network criteria;
    identify search results within the first set of search results that match the social network criteria for the first user; and
    apply ranking criteria to the search results in the first set of search result such that a rank of each search result that matches the social network criteria for the first user is boosted.

13. The method of claim 1, wherein the at least one author identifier of the one or more author identifiers that represents the second user is deemed to be associated, in a social network application, with the confirmed candidate identifier in accordance with a determination that the first user and the second user are connected in the social network application.

14. The server system of claim 5, wherein the at least one author identifier of the one or more author identifiers that represent the second user is deemed to be associated, in a social network application, with the confirmed candidate identifier in accordance with a determination that the first user and the second user are connected in the social network application.

15. The non-transitory computer readable storage medium of claim 9, wherein the at least one author identifier of the one or more author identifiers that represent the second user is deemed to be associated, in a social network application, with the confirmed candidate identifier in accordance with a determination that the first user and the second user are connected in the social network application.

16. The method of claim 1, wherein the at least one author identifier of the one or more author identifiers is determined to be associated, in a social network application, with the confirmed candidate identifier based on a frequency of communication between the one author identifier and the confirmed candidate identifier.

* * * * *